(12) United States Patent
Senetar, III

(10) Patent No.: US 7,850,756 B1
(45) Date of Patent: Dec. 14, 2010

(54) ANTI-MOVEMENT LOCK WITH BREAK-AWAY HOUSING MOUNT

(75) Inventor: Michael J. Senetar, III, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 908 days.

(21) Appl. No.: 11/737,183

(22) Filed: Apr. 19, 2007

(51) Int. Cl.
    *B01D 39/00* (2006.01)
(52) U.S. Cl. .................... 55/503; 55/385.2; 55/482; 55/484; 55/490; 55/529; 210/342; 210/338; 210/487; 210/497; 220/4.22; 220/4.33; 220/7; 220/284; 220/780
(58) Field of Classification Search ............ 55/385.3, 55/498, 502–504, 482, 484, 490, 497, 508, 55/510, 521–529; 220/4.13, 293, 297, 300, 220/4.22, 4.33, 7, 284, 780–789, 793–794; 210/342, 338, 487, 497
See application file for complete search history.

(56) References Cited

U.S. PATENT DOCUMENTS

| D407,475 | S | 3/1999 | Coulonvaux et al. |
| 6,039,778 | A | 3/2000 | Coulonvaux |
| 6,051,042 | A | 4/2000 | Coulonvaux |
| 6,402,798 | B1 | 6/2002 | Kallsen et al. |
| 6,436,162 | B1 | 8/2002 | Wake et al. |

*Primary Examiner*—Jason M Greene
*Assistant Examiner*—Karla Hawkins
(74) *Attorney, Agent, or Firm*—Andrus, Sceales, Starke & Sawall, LLP; J. Bruce Schelkopf

(57) ABSTRACT

A housing, which may be a filter housing, has break-away lock structure preventing movement in response to normal release force, and breaking-away from a housing section upon excessive release force, such that the housing may be re-assembled using the same housing sections, without having to use a new housing section to replace an old housing section otherwise having a non-re-mountable broken-off lock member.

9 Claims, 12 Drawing Sheets

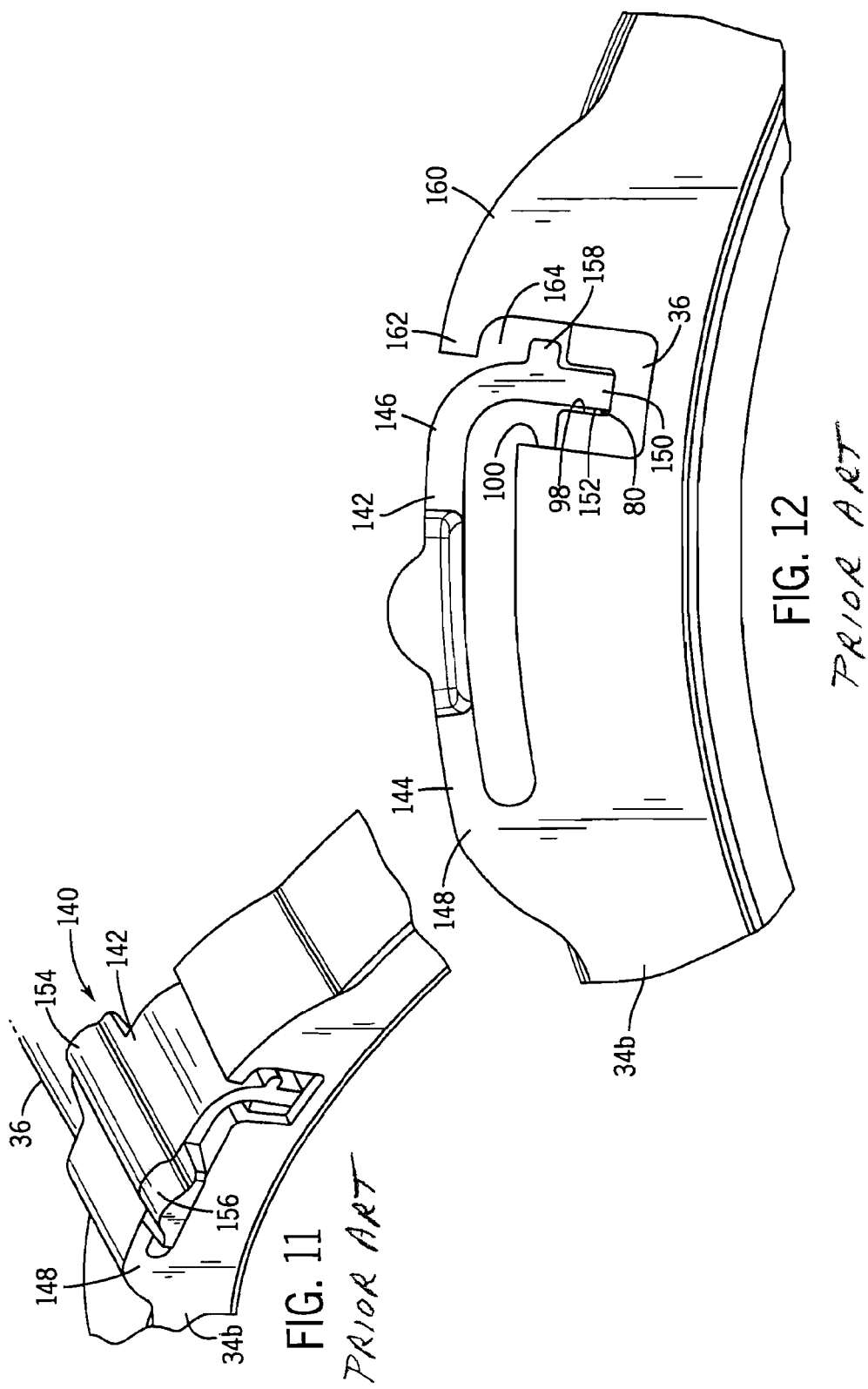

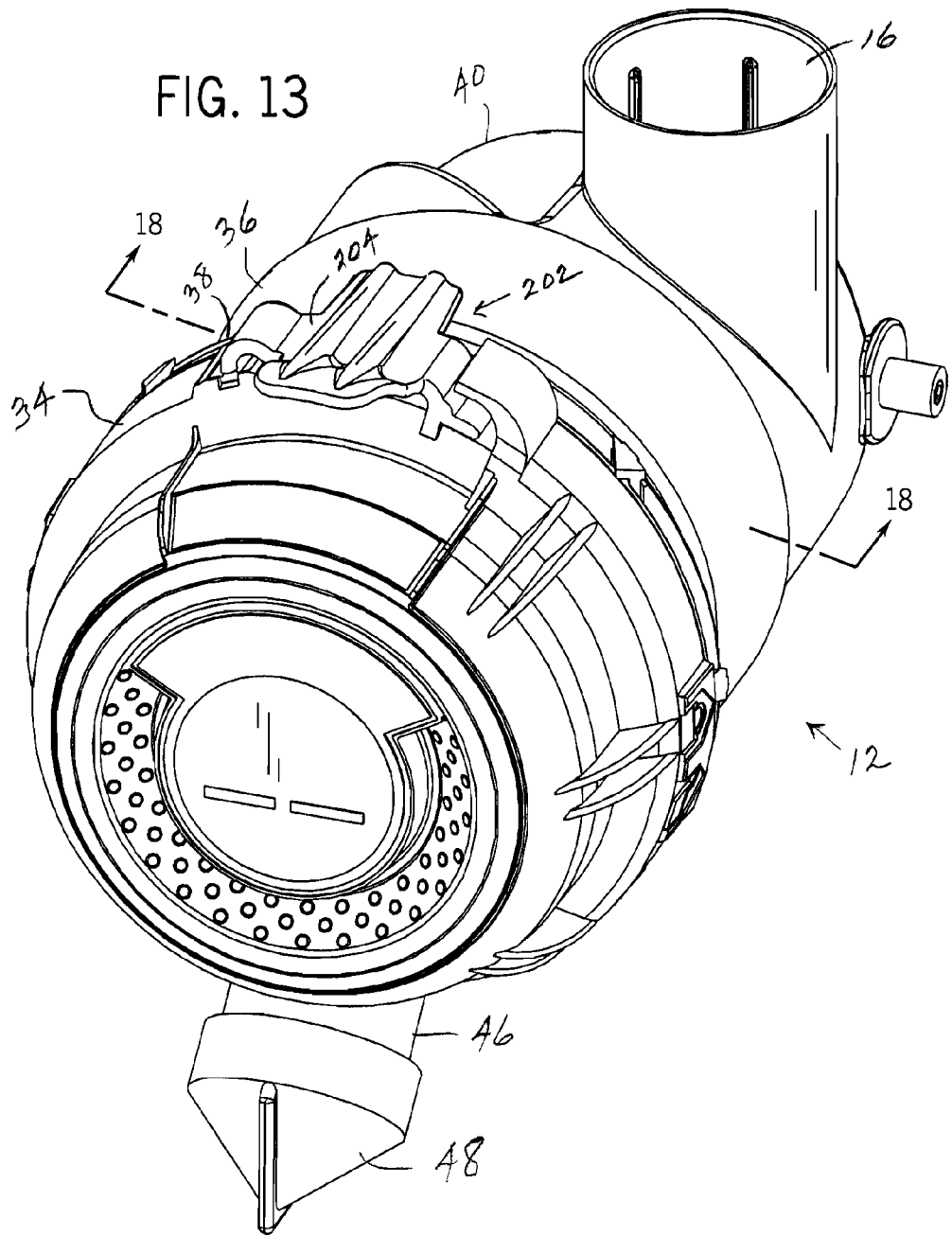

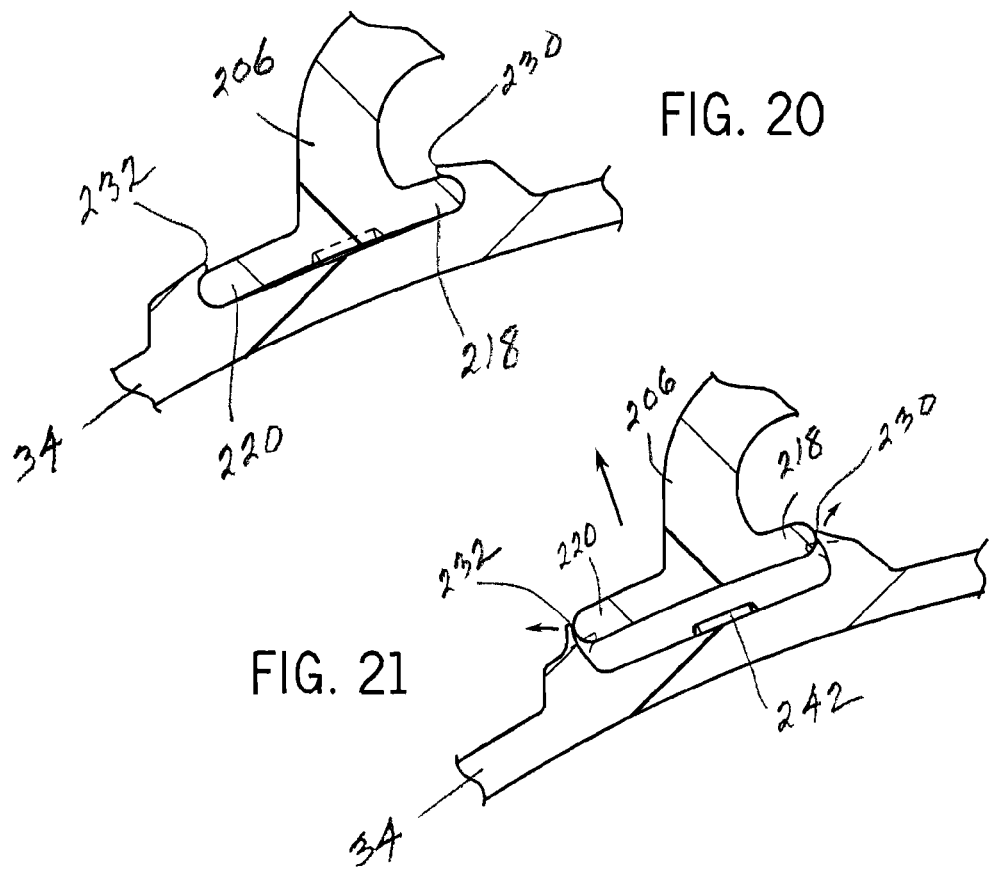
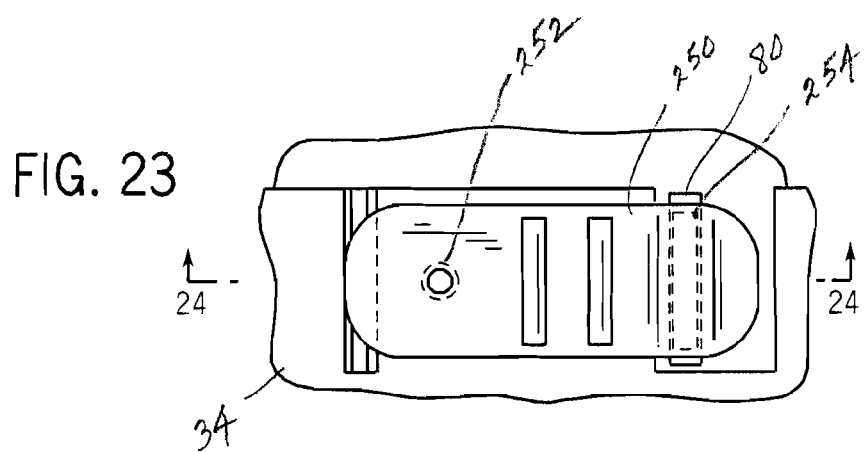

ated U.S. Pat. No. 6,402,798.

ANTI-MOVEMENT LOCK WITH BREAK-AWAY HOUSING MOUNT

BACKGROUND AND SUMMARY

The invention relates to housings, including filter housings, having anti-movement lock structure.

The invention arose during continuing development efforts directed toward twist and lock filter housings, for example as shown in U.S. Pat. No. 6,402,798, incorporated herein by reference. Such filter housing has an anti-rotation stop stopping rotation of mating filter housing sections, including translational movement along their peripheries, from a locked position to an unlocked position, to thus maintain the filter housing in an assembled condition. If excessive force is applied to the lock structure to open same, it may fracture or break. This in turn requires that the entire housing section be replaced when reassembling the housing. The present invention addresses and solves this problem. The invention has application to filter housings and other housings having first and second mating housing sections.

BRIEF DESCRIPTION OF THE DRAWINGS

Prior Art

FIGS. 1-12 are taken from incorporated U.S. Pat. No. 6,402,798.

FIG. 1 is a perspective view of an assembled filter housing in accordance with the '798 patent.

FIG. 2 is an exploded perspective view of a portion of the structure of FIG. 1.

FIG. 3 is a sectional view taken along line 3-3 of FIG. 1.

FIG. 4 is a sectional view taken along line 4-4 of FIG. 3, and shows the parts after twisting and locking.

FIG. 5 is like FIG. 4 and shows the parts after return twisting and unlocking.

FIG. 6 is a sectional view taken along line 6-6 of FIG. 3.

FIG. 7 is like FIG. 6 and shows release of the anti-rotation lock structure.

FIG. 8 is a perspective view of a portion of FIG. 1 and shows an alternate embodiment.

FIG. 9 is a sectional view taken along line 9-9 of FIG. 8.

FIG. 10 is like FIG. 9 and shows release of the anti-rotation lock structure.

FIG. 11 is a perspective view like FIG. 8 and shows another embodiment.

FIG. 12 is an enlarged side sectional view of the structure of FIG. 11.

Present Invention

FIG. 13 is a perspective view of an assembled housing in accordance with the present invention.

Figure 14:
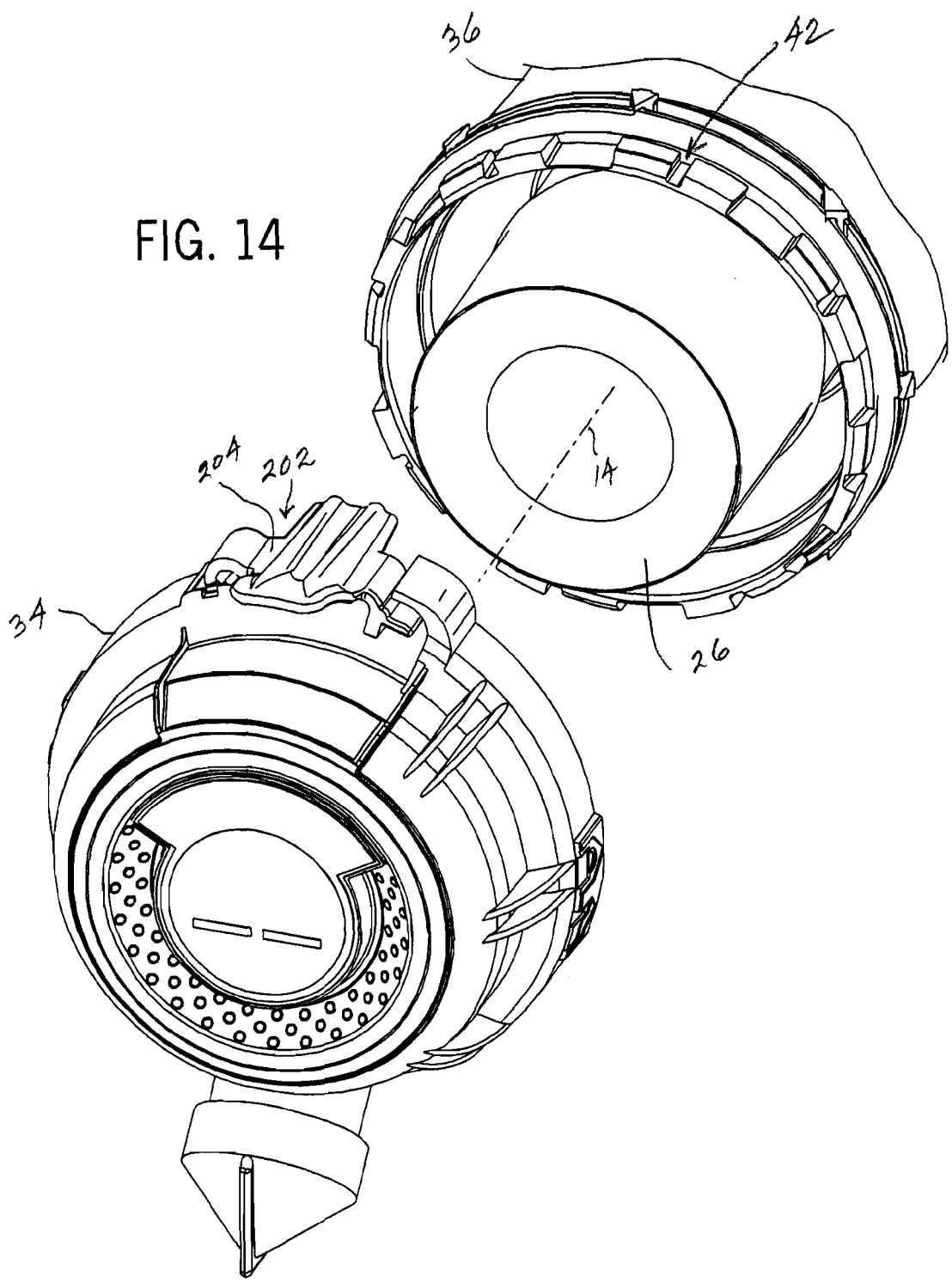

FIG. 14 is an exploded perspective view of a portion of the structure of FIG. 13.

Figure 15:
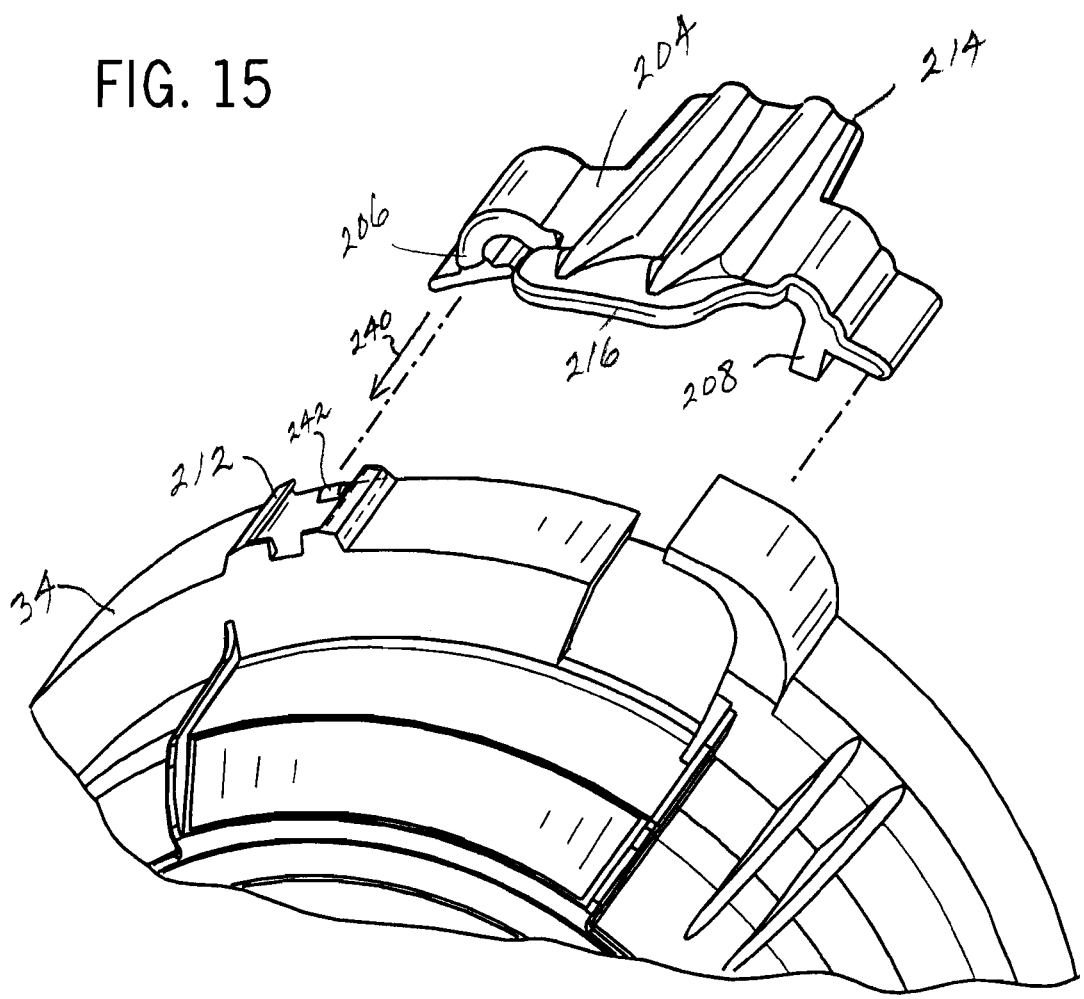

FIG. 15 is an exploded perspective view of a portion of the structure of FIG. 14.

Figure 16:
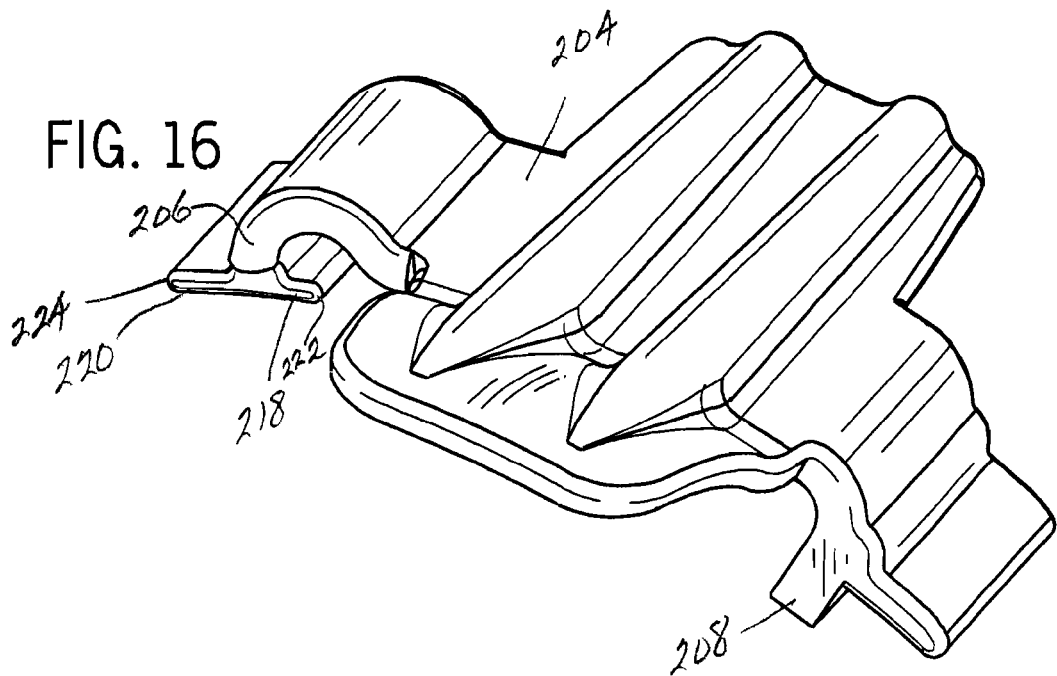

FIG. 16 is an enlarged view of a component to FIG. 15.

Figure 17:
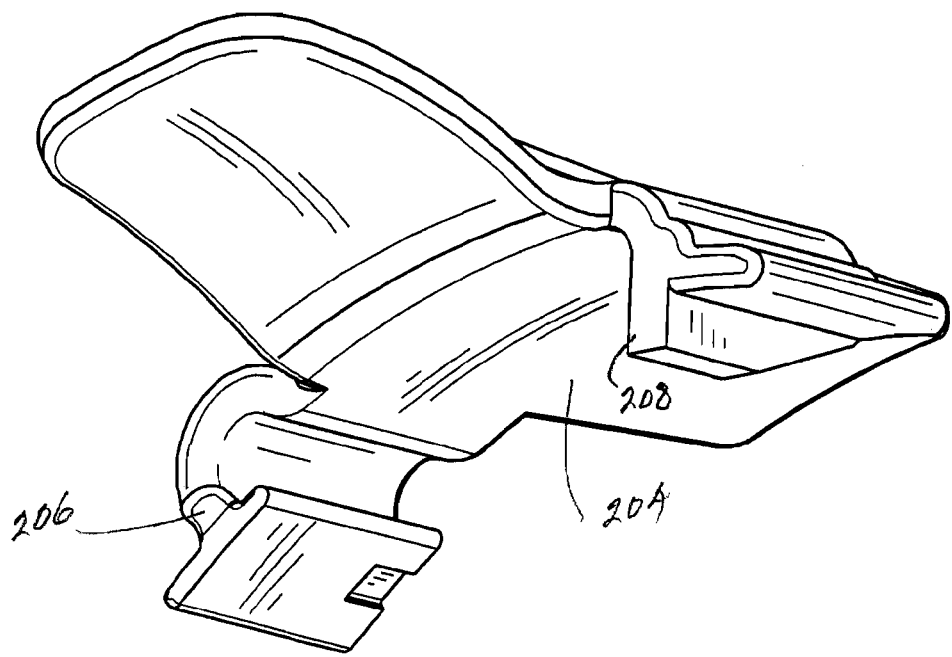

FIG. 17 is a perspective view of the component of FIG. 16 from a different angle.

Figure 18:
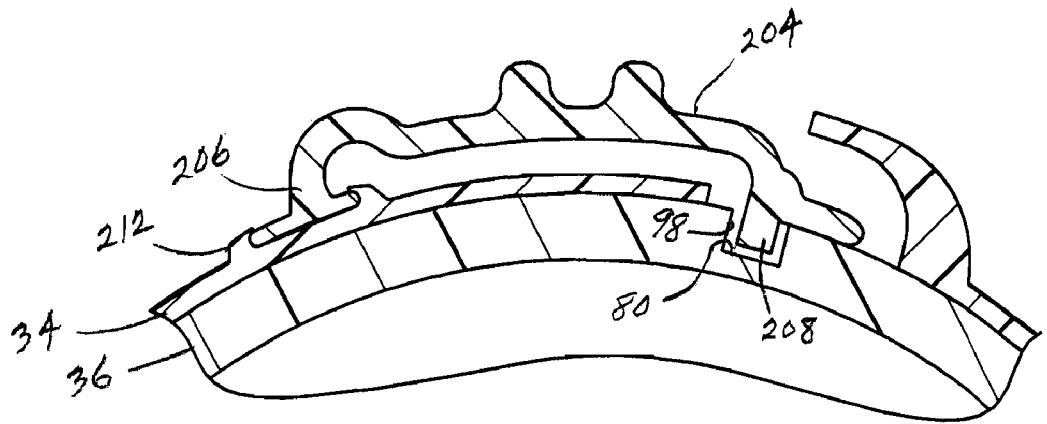

FIG. 18 is a sectional view taken along line 18-18 of FIG. 13.

Figure 19:
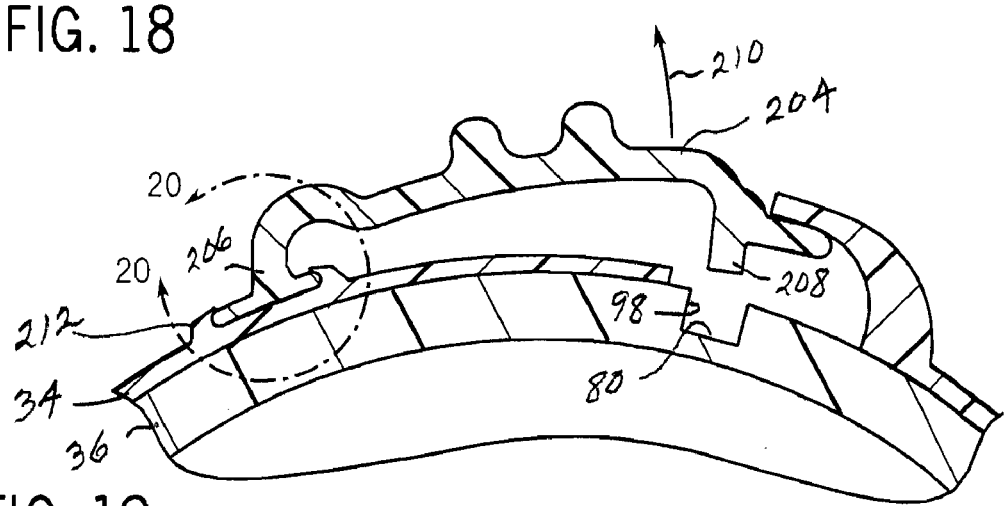

FIG. 19 is like FIG. 18 and shows a release position of the lock structure.

FIG. 20 is an enlarged view of a portion of FIG. 19 at line 20-20.

FIG. 21 is like FIG. 20 and shows break-away of the lock structure.

Figure 22:
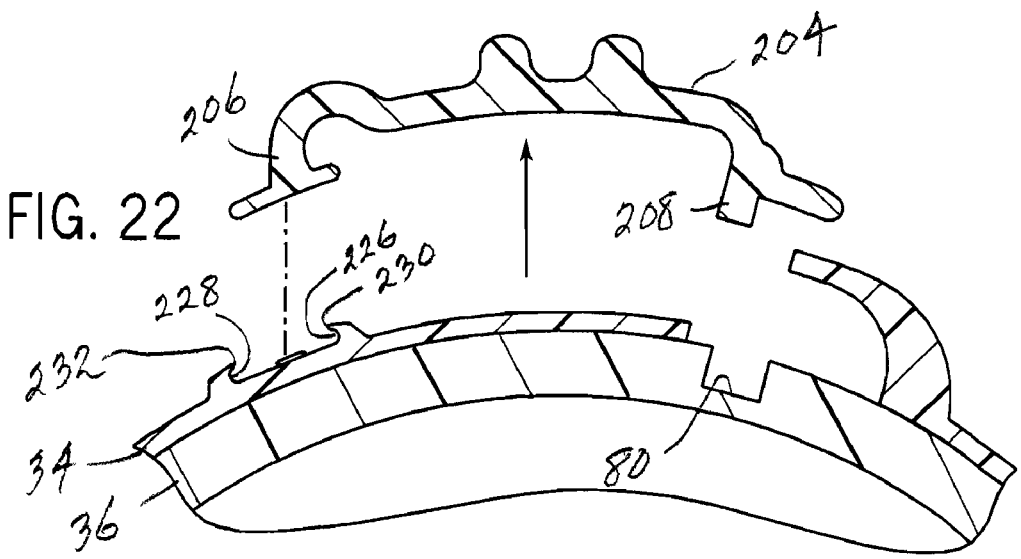

FIG. 22 is like FIG. 19 and shows separation of the lock structure.

FIG. 23 is a top view of alternate lock structure.

Figure 24:
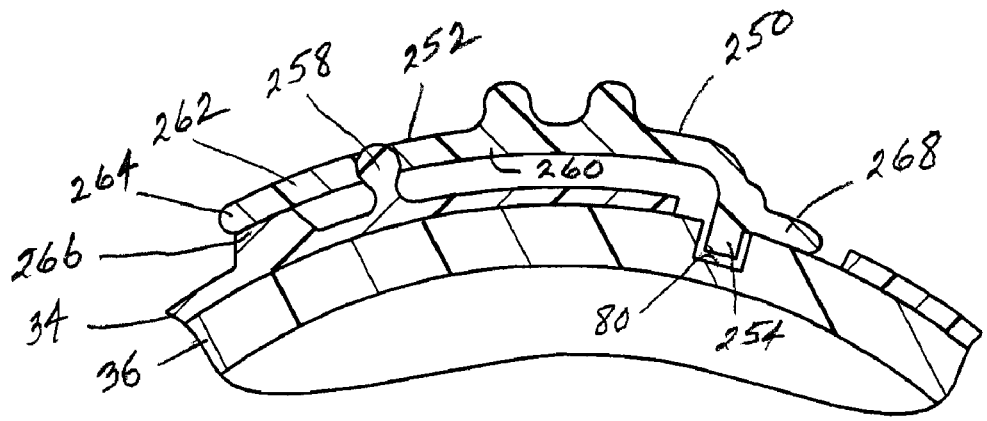

FIG. 24 is a sectional view taken along line 24-24 of FIG. 23.

Figure 25:
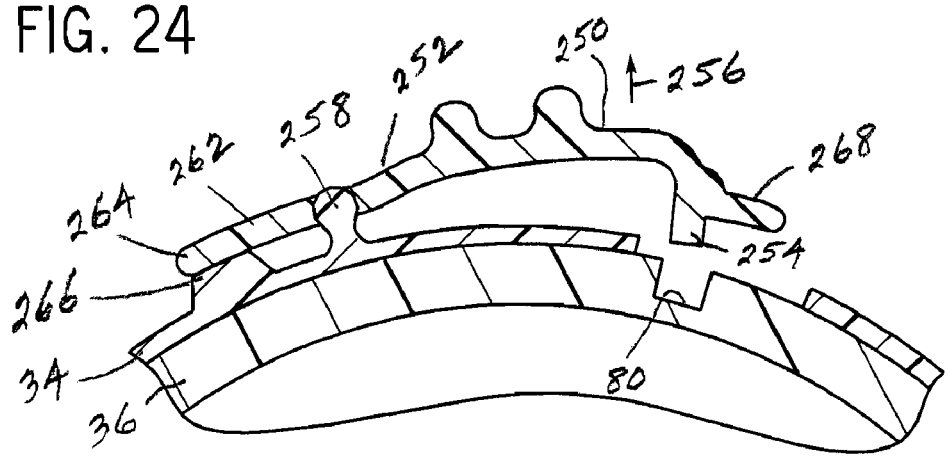

FIG. 25 is like FIG. 24 and shows the lock structure in a release position.

Figure 26:
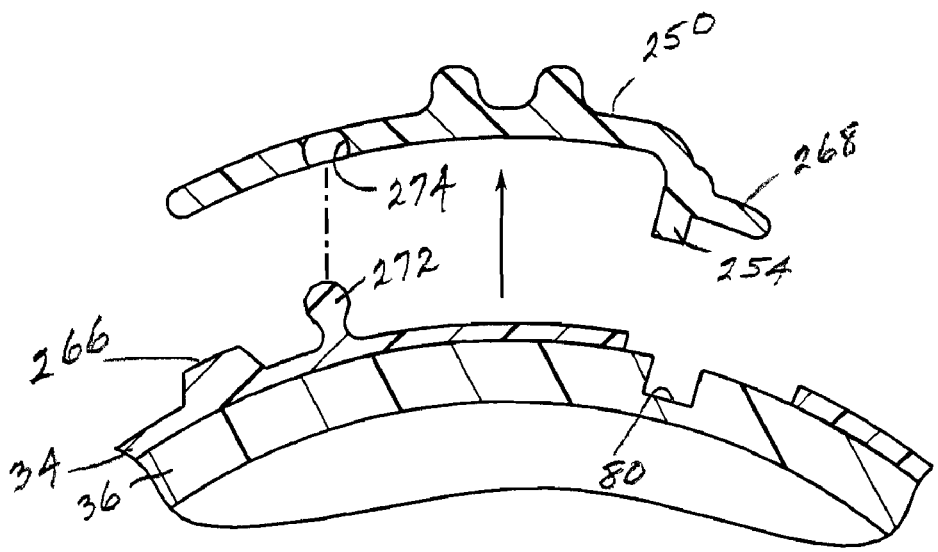

FIG. 26 is like FIG. 25 and shows separation of the lock structure.

DETAILED DESCRIPTION

Prior Art

The following description of FIGS. 1-12 is taken from incorporated U.S. Pat. No. 6,402,798.

FIGS. 1-5 show a filter housing 12 extending along an axis 14 and having an air inlet 16 for receiving dirty air as shown at arrow 18, and an air outlet elbow 20 for discharging clean filtered air as shown at arrow 22. The dirty air flows into an annular space 24, FIG. 3, in the housing and then radially inwardly through annular filter element 26 into hollow interior 28 and then axially rightwardly in FIG. 3 through outlet 20. Filter element 26 is provided by an annulus of pleated filter media potted in distally opposite axial end caps 30 and 32 which are preferably formed of compressible material such as urethane, all as is known in the art. The housing has first and second mating housing sections provided by a cover 34 and base 36. Base 36 extends axially between distally opposite axial ends 38 and 40. Cover 34 is mounted to axial end 38 of the base by twist and lock structure 42, FIG. 2, to be described, providing an axial retention force holding base 36 and cover 34 in axial assembled condition upon axial movement of the base and cover towards each other followed by rotation in a first rotational direction 44, FIG. 4, about axis 14, e.g. rotation of cover 34 clockwise as shown at arrow 44 in FIG. 1. In the assembled condition, FIG. 3, end caps 30 and 32 are axially compressed to provide sealing and prevent bypass of dirty air from space 24 around the filter to hollow interior 28. Cover 34 engages and locates end cap 30, and base 36 engages and locates end cap 32. Cover 34 includes a drain outlet 46 with a drain valve 48 for discharging collected material, including liquid, from annular space 24, as is known.

Figure 1:
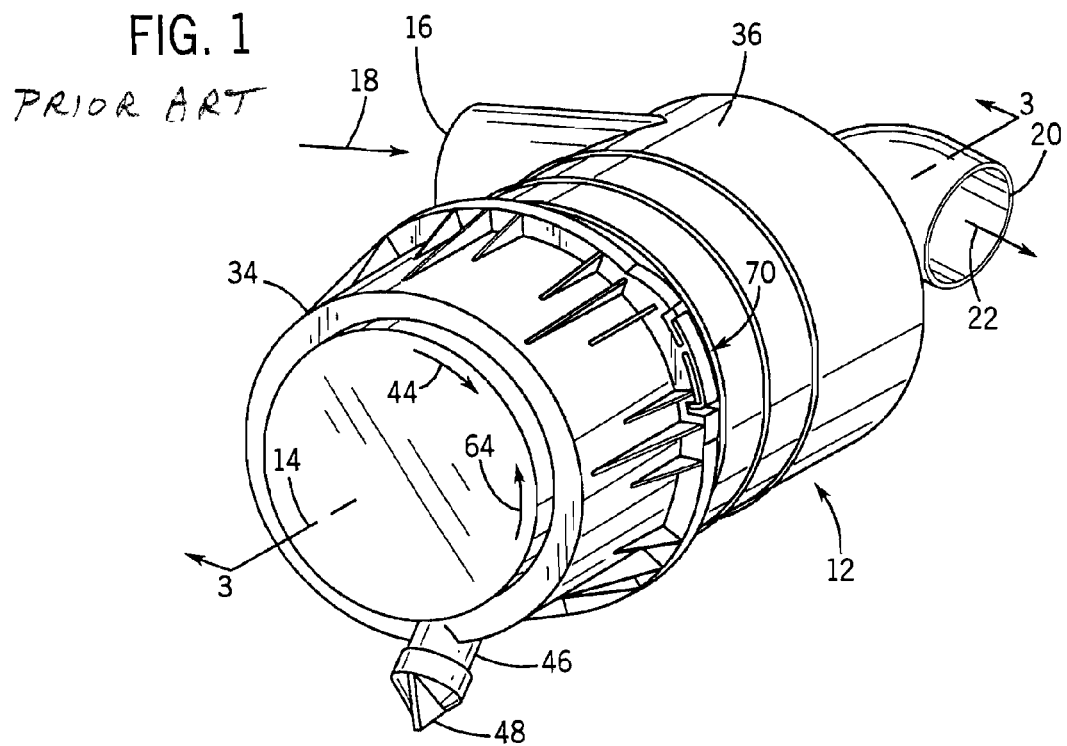
Figure 2:
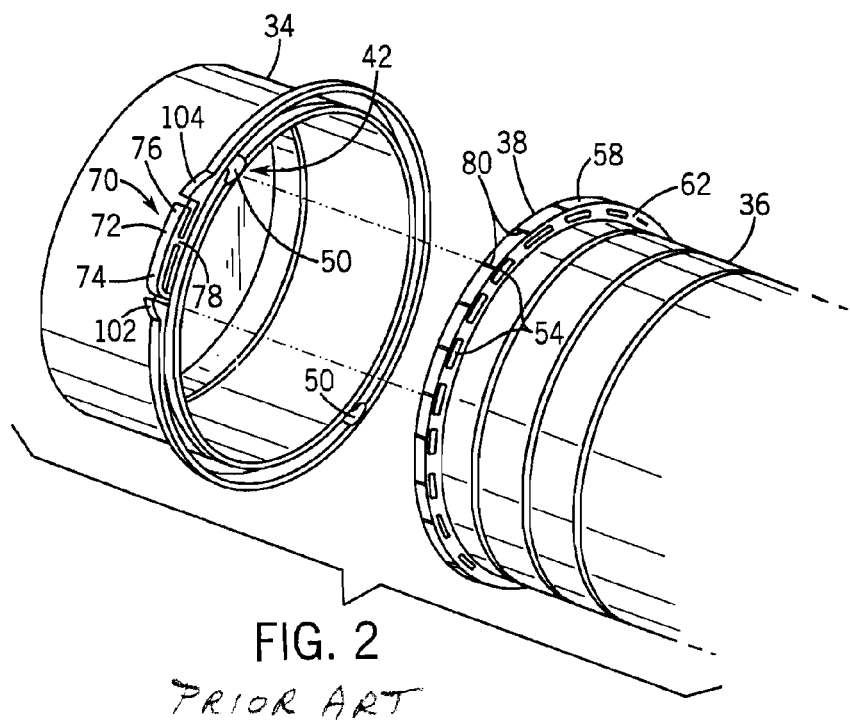
Figure 3:
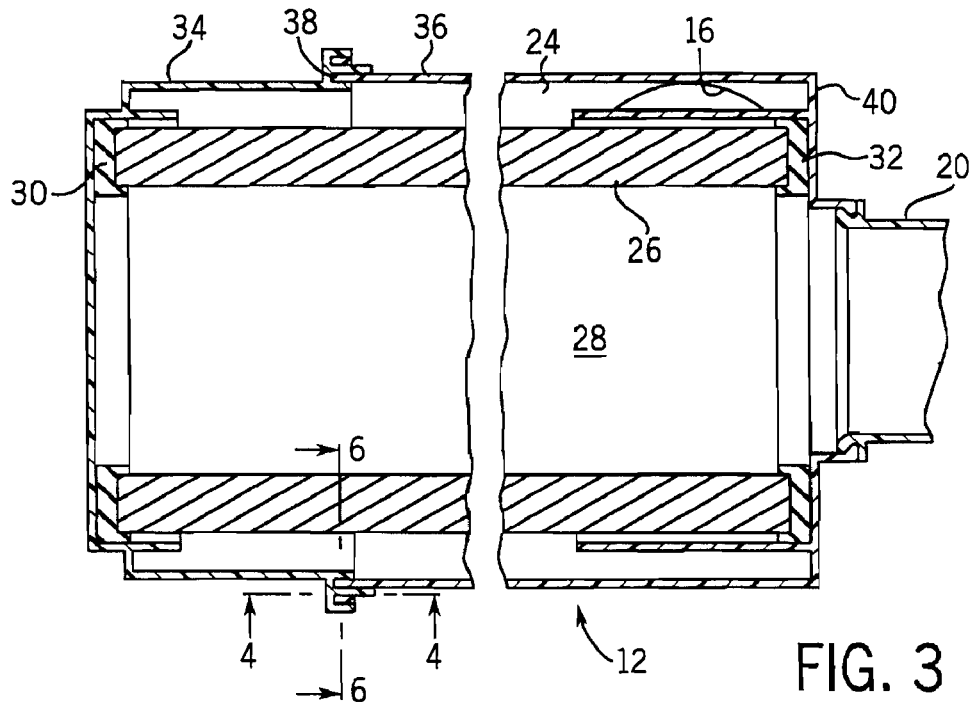
Figure 4:
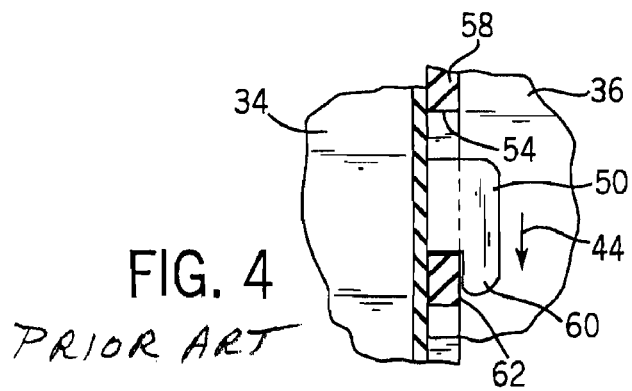
Figure 5:
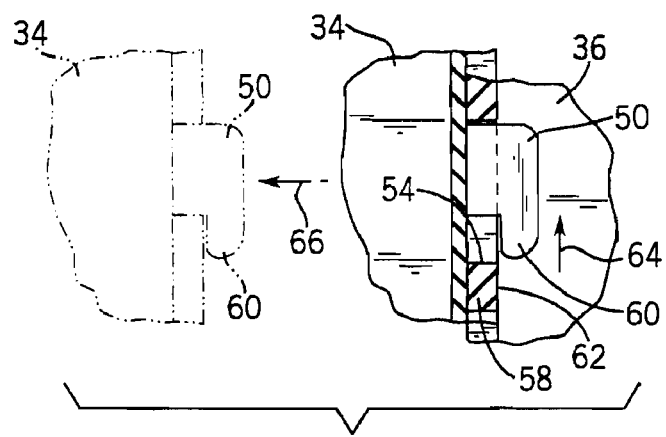

Twist and lock structure 42, FIG. 2, includes a plurality of hooks 50 on cover 34 engaging a respective one of a plurality of catches 54 on base 36. The catches are formed by respective through-slots in annular raised rim 58 at end 38 of base 36. Cover 34 is slid axially rightwardly in FIG. 2 such that hook 50 passes axially through slot 54, and the remaining hooks pass through their respective mating slots, and then cover 34 is turned or twisted to rotate about axis 14, arrow 44, FIGS. 1 and 4, so that tip 60, FIG. 4, of hook 50 slides along and behind the axially rightwardly facing rear surface 62 of rim 58, and such that the tips of remaining hooks slide along and behind the axially rightwardly facing rear surface 62 of rim 58. The number of hooks may be varied to provide a desired axial retention force balanced around the circumference of the housing. In an alternative, the hooks can be provided on base 36, and the catches on cover 34. The noted axial insertion of cover 34 onto base 36 followed by rotation provides twist and lock operation providing an axial retention force holding the base and cover in axial assembled condition. The twist and lock structure has a first position, FIG. 5, permitting axial movement of the base and cover relative to each other. The twist and lock structure is rotatable in a first rotational direction 44 from the first position to a second position, FIG. 4. The twist and lock structure in the second position, FIG. 4, prevents axial movement of the base and cover relative to each other. The twist and lock structure is rotatable in a second rotational direction 64, FIG. 5, from the locked second position to the unlocked first position. Rotational direction 64 is opposite to rotational direction 44. Referring to FIGS. 1, 4 and 5, cover 34 is rotated along rotational direction 44 to the second locking position, and is rotated along rotational direction 64 to the first unlocking position. In the unlocked position, cover 34 may be axially removed from base 36, as shown at axial leftward arrow 66 in FIG. 5.

Anti-rotation lock structure 70, FIGS. 1, 2, provides a rotational retention force holding the twist and lock structure in the noted locked second position. The anti-rotation lock structure is provided by a teeter-totter 72 having a pair of oppositely extending arms 74 and 76 integrally joined to each other and integrally mounted to and formed as part of cover 34 at fulcrum 78. Arm 74 extends partially circumferentially along cover 34 and releasably engages base 36 at a respective one of a plurality of slots 80 in raised annular rim 58 of the base and applies a rotational retention force in a direction along arm 74 tangent to the noted arc of rotation and holding the twist and lock structure 42 in the noted locked second position, FIGS. 6 and 4.

Figure 6:
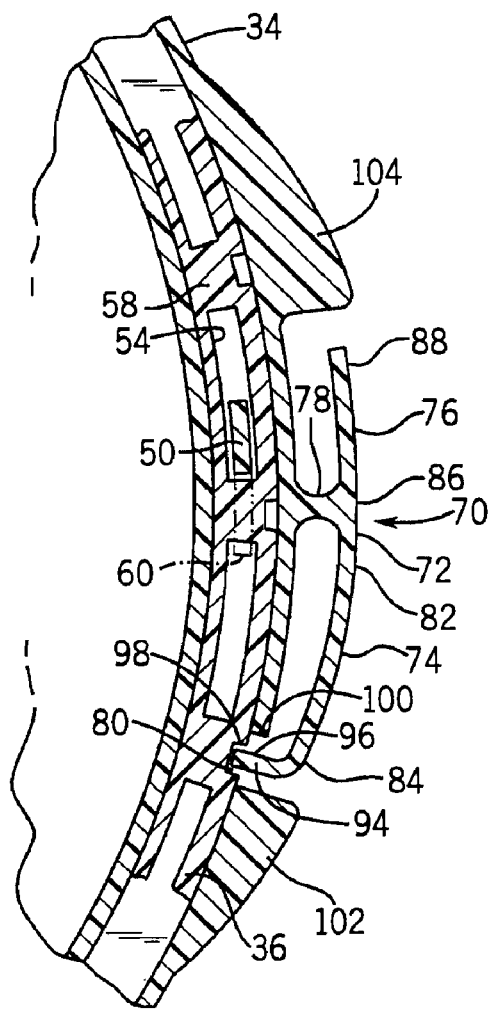

Arm 74 extends between first and second circumferentially spaced ends 82 and 84, FIG. 6. End 82 is stationarily integrally mounted to cover 34 at fulcrum 78. Arm 74 flexes along a bend line at fulcrum 78, FIG. 7, which bend line is parallel to axis 14 and perpendicular to the noted arc of rotation and to the noted retention force direction. Arm 76 extends partially circumferentially along the noted arc of rotation between first and second circumferentially spaced ends 86 and 88. End 86 is common with end 82 and stationarily integrally mounted to cover 34 at fulcrum 78. Arm 76 extends from fulcrum 78 oppositely from arm 74 to form teeter-totter 72. Radial inward depression of end 88 of arm 76, as shown at arrow 90 in FIG. 7, causes radial outward movement of end 84 of arm 74, as shown at arrow 92, to release twist and lock structure 42 to rotate from the noted second locked position, FIGS. 4, 6, to the noted first unlocked position, FIGS. 5, 7.

Arm 74 at end 84 has a hook portion 94 having a stop surface 96 extending radially relative to axis 14 and facing toward end 82 of arm 74. Base 36 has a stop surface 98 extending radially relative to axis 14 and facing away from end 82 of arm 74. Stop surfaces 96 and 98 engage each other in the noted second locked position of twist and lock structure 42 to provide the noted rotational retention force. Arm 74 is manually releasable to flex about the noted bend line at fulcrum 78 to disengage stop surfaces 96 and 98, FIG. 7, by moving stop surface 96 radially outwardly, as shown at arrow 92, out of the path of movement of stop surface 98 in slot or groove 80 of raised annular rim 58 of base 36, to permit rotation of twist and lock structure 42 from the second locking position, FIGS. 6, 4, to the first unlocked position, FIGS. 5, 7.

Figure 7:
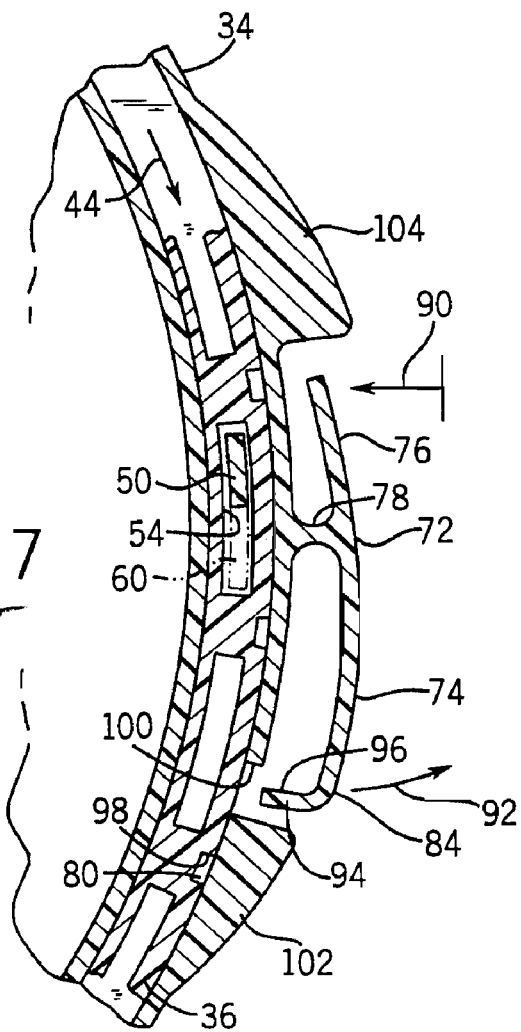

Cover 34 has a slot or groove 100, FIG. 7, radially aligned with and receiving hook portion 94 of arm 74 therein. Base 36 has a plurality of the previously noted slots or grooves 80 facing radially outwardly from raised annular rim 58 and axially alignable with slot 100 during rotation of the cover and base. Hook portion 94 of arm 74 extends into slot 100 and a respective one of slots 80 to provide the noted rotational retention force holding twist and lock structure 42 in the second locked position, FIGS. 4, 6. Arm 74 is manually flexed about the bend line at fulcrum 78 to move hook portion 94 radially outwardly out of slot 80 to permit rotation of the twist and lock structure from the noted second locked position to the noted first unlocked position. Arm 74 may be manually flexed radially outwardly as shown at arrow 92, FIG. 7, by radially inwardly depressing arm 76 as shown at arrow 90, or by gripping arm 74 with the user's fingers and pulling it radially outwardly. A pair of protective side shrouds 102 and 104, FIGS. 2, 6, extend radially outwardly from cover 34 adjacent respective arms 74 and 76 to prevent accidental unintentional release thereof. Protective side shroud 102 is adjacent end 84 of arm 74 and is circumferentially spaced therefrom. Protective side shroud 104 is adjacent end 88 of arm 76 and is circumferentially spaced therefrom.

Figure 8:
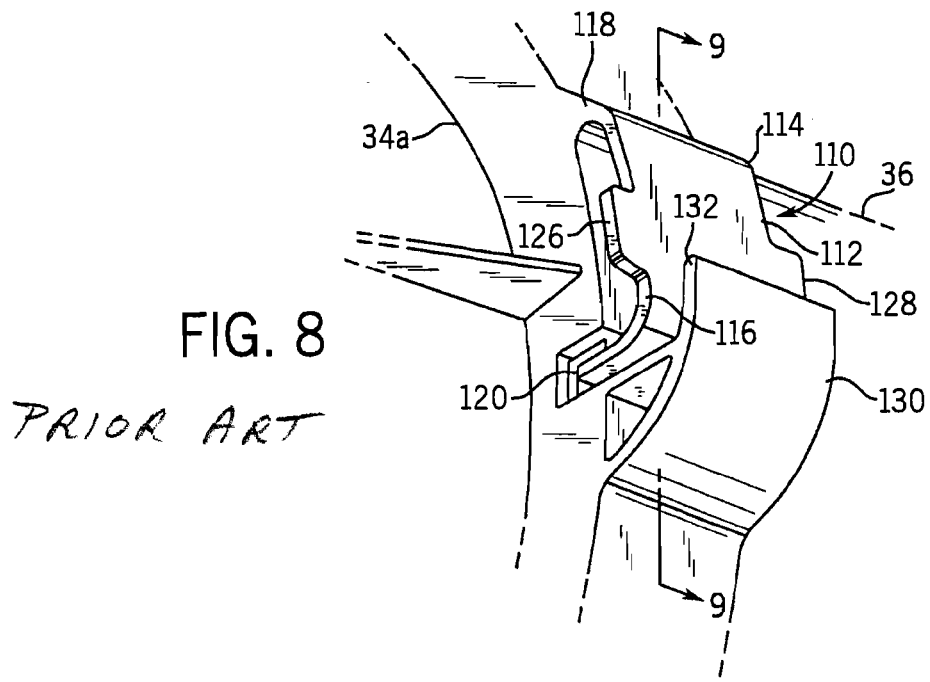
Figure 9:
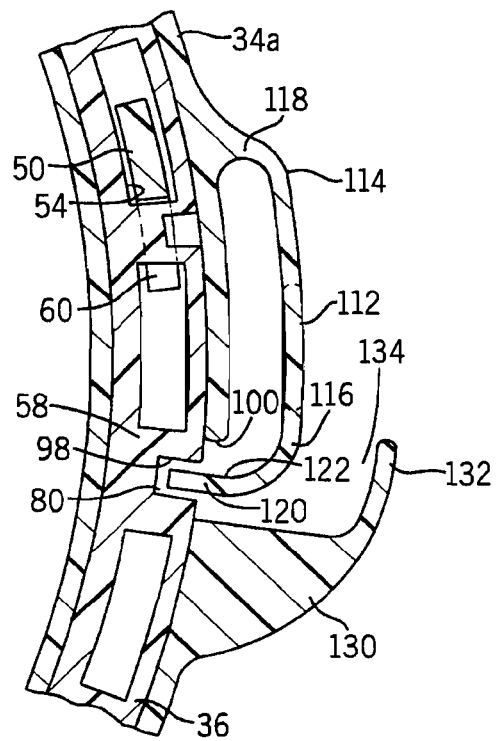
Figure 10:
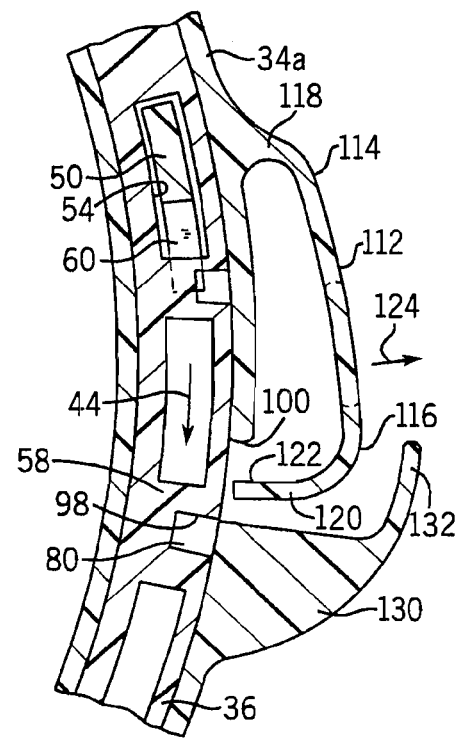

FIGS. 8-10 show an alternate embodiment and use like reference numerals from above where appropriate to facilitate understanding. FIGS. 8-10 show alternate anti-rotation lock structure 110 provided by a cantilever arm 112 having a first root end 114 and a second free end 116. Arm 112 extends partially circumferentially along cover 34a along the arc of rotation thereof and releasably engages base 36 and applies a rotational retention force in a direction along the arm tangent to the noted arc of rotation and holding twist and lock structure 42 in the noted second locked position, FIGS. 4, 9, comparably to arm 74. Arm 112 extends between circumferentially spaced ends 114 and 116. End 114 is stationarily integrally mounted to cover 34a at hinge 118, comparably to fulcrum 78. Arm 112 flexes along a bend line at hinge 118, FIG. 10, which bend line is parallel to axis 14 and perpendicular to the noted arc of rotation and the noted retention force direction.

Free end 116 of arm 112 has a hook portion 120, FIG. 9, engaging base 36. Hook portion 120 has a stop surface 122 extending radially relative to axis 14 and facing toward end 114 of arm 112. Base 36 has the noted stop surface 98 extending radially relative to axis 14 and facing away from end 114 of arm 112. Stop surfaces 122 and 98 engage each other in the noted second locked position of twist and lock structure 42, FIGS. 4, 9, to provide the noted rotational retention force. Arm 112 is manually releasable to flex about the noted bend line to disengage stop surfaces 122 and 98, FIG. 10, by moving stop surface 122 radially outwardly, as shown at arrow 124 in FIG. 10, out of the path of movement of stop surface 98, to permit rotation of the twist and lock structure from the second locked position, FIGS. 4, 9, to the first unlocked position, FIGS. 5, 10. A pair of distally opposite gripper wings 126 and 128, FIG. 8, extend axially from arm 112 for manual engagement by the fingers of the user and radial outward pulling of free end 116 of the arm to release the twist and lock structure to rotate from the second locked position to the first unlocked position. Slot 100 in cover 34a is radially aligned with and receives hook portion 120 therein. Slots or grooves 80 in raised annular rim 58 of base 36 are axially alignable with slot 100 during rotation of the cover and base. Hook portion 120 extends into slot 100 and a respective one of slots 80 to provide the noted rotational retention force holding the twist and lock structure in the second locked position. Arm 112 is manually flexed about the noted bend line to move hook portion 120 radially outwardly, as shown at arrow 124 in FIG. 10, out of slot 80 to permit rotation of the twist and lock structure from the second locked position to the first unlocked position.

A protective side shroud 130, FIGS. 8-10, extends radially outwardly from cover 34a adjacent arm 112 to prevent accidental unintentional release thereof. Shroud 130 is adjacent free end 116 of arm 112 and is circumferentially spaced therefrom. Shroud 130 includes an outer guard portion 132 extending partially circumferentially along the noted arc of rotation and spaced radially outwardly of arm 112 and limiting the radial outward travel of arm 112 to prevent overbending thereof. Guard portion 132 is spaced radially outwardly beyond arm 112 by a gap 134 having a radial height greater than the radial depth of insertion of hook portion 120 into respective slot 80.

FIGS. 11 and 12 show another alternate embodiment and use like reference numerals from above where appropriate to facilitate understanding. FIGS. 11 and 12 show alternate anti-rotation lock structure 140 provided by a cantilever arm 142 having a first root end 144 and a second free end 146. Arm 142 extends partially circumferentially along cover 34b along the arc of rotation thereof and releasably engages base 36 and applies a rotational retention force in a direction along the arm tangent to the noted arc of rotation and holding twist and lock structure 42 in the noted second locked position, FIGS. 4, 6, 9, 12, comparably to arms 74 and 112. Arm 142 extends between circumferentially spaced ends 144 and 146. End 144 is stationarily integrally mounted to cover 34b at hinge 148, comparably to fulcrum 78 and hinge 118. Arm 142 flexes along a bend line at hinge 148, which bend line is parallel to axis 14 and perpendicular to the noted arc of rotation and the noted retention force direction.

Free end 146 of arm 142 has a hook portion 150 engaging base 36. Hook portion 150 has a stop surface 152 extending radially relative to axis 14 and facing toward end 144 of arm 142. Base 36 has the noted stop surface 98 extending radially relative to axis 14 and facing away from end 144 of arm 142. Stop surfaces 152 and 98 engage each other in the noted second locked position of twist and lock structure 42, FIGS. 4, 6, 9, 12, to provide the noted rotational retention force. Arm 142 is manually releasable to flex about the noted bend line to disengage stop surfaces 152 and 98 by moving stop surface 152 radially outwardly out of the path of movement of stop surface 98, to permit rotation of the twist and lock structure from the second locked position, FIGS. 4, 6, 9, 12, to the first unlocked position, FIGS. 5, 7, 10. A pair of distally opposite gripper wings 154, 156 extend axially from arm 142 for manual engagement by the fingers of the user and radial outward pulling of free end 146 of the arm to release the twist and lock structure to rotate from the second locked position to the first unlocked position. Slot 100 in cover 34b is radially aligned with and receives hook portion 150 therein. Slots or grooves 80 in raised annular rim 58 of base 36 are axially alignable with slot 100 during rotation of the cover and base. Hook portion 150 extends into slot 100 and a respective one of slots 80 to provide the noted rotational retention force holding the twist and lock structure in the second locked position. Arm 142 is manually flexed about the noted bend line to move hook portion 150 radially outwardly out of slot 80 to permit rotation of the twist and lock structure from the second locked position to the first unlocked position.

Hook portion 150 of arm 142 has a projection 158, FIG. 12, extending therefrom. A protective side shroud 160 extends radially outwardly from cover 34b adjacent arm 142 to prevent accidental unintentional release thereof. Shroud 160 is adjacent free end 146 of arm 142 and is circumferentially spaced therefrom. Shroud 160 includes an outer guard portion 162 having a radial height substantially no greater than arm 142 in the noted second locked position, FIG. 12. Guard portion 162 is spaced radially outwardly of and lies in the path of radial outward movement of projection 158 and limits the radial outward travel of arm 142 to prevent overbending thereof. Guard portion 162 is spaced radially outwardly beyond projection 158 by a gap 164 having a radial height greater than the radial depth of insertion of hook portion 150 into slot 80. Guard portion 162 is circumferentially aligned with and spaced from arm 142.

Each of the described anti-rotation lock structures 70, 110, 140 includes an arm 74, 112, 142 stationarily mounted to the cover. Alternatively, the arm may be mounted to base 36. The arm is flexibly bendable about a bend line 78, 118, 148 extending parallel to axis 14. The arm has a hook portion 94, 120, 150 engageable with the mating housing section and applying a rotational retention force stopping rotation of the twist and lock structure 42 from the noted second locked position, FIGS. 4, 6, 9, 12 to the first unlocked position, FIGS. 5, 7, 10. The direction of force is along the arm 74, 112, 142 for enhanced strength, rather than transverse thereto which may otherwise cause torsional twisting of the arm along a torsional twist line other than the bend line 78, 118, 148. The noted direction of retention force is perpendicular to such bend line.

Present Invention

FIGS. 13-26 illustrate the present invention and use like reference numerals from above where appropriate to facilitate understanding.

Filter housing 12, FIGS. 1, 13 houses filter element 26, FIG. 14, and extends along axis 14 and includes first and second mating housing sections provided by a cover 34 and base 36. Base 36 extends axially between distally opposite axial ends 38 and 40. Cover 34 is mounted to axial end 38 of the base by twist and lock structure 42, as above, FIG. 2, providing an axial retention force holding the base and cover in axial assembled condition upon axial movement of the base and cover towards each other followed by rotation in a first rotational direction 44, FIGS. 1, 4, about axis 14, e.g. rotation of cover 34 clockwise as shown at arrow 44 in FIGS. 1, 4. The twist and lock structure has a first position, FIG. 5, permitting axial movement of the base and cover relative to each other. The twist and lock structure is rotatable in the noted first rotational direction 44 from the first position to a second position, FIG. 4. The twist and lock structure in the second position, FIG. 4, prevents axial movement of the base and cover relative to each other. The twist and lock structure is rotatable in a second rotational direction 64, FIGS. 1, 5, from the locked second position to the unlocked first position. Rotational direction 64 is opposite to rotational direction 44. Referring to FIGS. 1, 4, 5, cover 34 is rotated along rotational direction 44 to the second locking position, and is rotated along rotational direction 64 to the first unlocking position. During rotation, the outer peripheries of the base and cover translate along each other along respective translational directions. In the unlocked position, cover 34 may be axially removed from base 36, as shown at axially leftward arrow 66 in FIG. 5. The filter housing has an air inlet 16 receiving dirty air as shown at arrow 18, and an air outlet elbow 20, as shown in solid line in FIG. 1 and hidden in the view in FIG. 13, for discharging clean filtered air as shown at arrow 22. The dirty air flows into an annular space 24, FIG. 3, in the housing and then radially inwardly through annular filter element 26 into hollow interior 28 and then axially rightwardly in FIG. 3 through outlet 20. Filter element 26 is provided by an annulus of pleated filter media potted in distally opposite axial end caps 30 and 32 which are preferably formed of compressible material such as urethane, all as is known. Cover 34 includes a drain outlet 46 with a drain valve 48 for discharging collected material, including liquid, from annular space 24, as is known.

Anti-rotation lock structure 202, FIGS. 13-18, provides a rotational retention force holding the twist and lock structure in the noted locked second position. The anti-rotation lock structure 202 includes an arm 204, FIGS. 16-18, having an anchor portion 206 mounted to the noted first housing section provided by cover 34. Arm 204 has a hook portion 208 engageable with the noted second housing section provided by base 36 and applying a retention force, by insertion of hook portion 208 into slot 80 and engagement against stop surface 98, FIGS. 6, 9, 12, 18, thus stopping rotation of the twist and lock structure from the noted second position to the noted first position. Hook portion 208 is normally releasable from engagement with cover 34 at slot 80 upon applying a first release force to arm 204 as shown at arrow 124 in FIG. 10 and arrow 210 in FIG. 19.

In the construction of FIGS. 13-22, anchor portion 206 of arm 204 is releasably mounted to the noted first housing section provided by cover 34. Anchor portion 206 is mounted to cover 34 at a break-away mount 212 releasing anchor portion 206 from cover 34 in response to a second release force greater than the first noted release force, such that arm 204 separates from cover 34 without breaking the arm if a) excessive force higher than normal is required to release hook portion 208 from the second housing section provided by base 36, or b) excessive force is continued to be applied to arm 204 even after release of hook portion 208 from base 36 at slot 80, such that housing 12 may be re-assembled using the same first and second housing sections 34 and 36 with arm 204 re-mounted to first housing section 34 at break-away mount 212 without having to use a new first housing section for cover 34 to replace an old cover otherwise having a non-re-mountable broken off arm. Arm 204 has a pair of distally opposite gripper wings 214, 216, comparable to gripper wings 126, 128 of FIG. 8, for engagement by the fingers of the user to apply the noted release force to arm 204.

Anchor portion 206 of arm 204 and break-away mount 212 of cover 34 engage each other in interference fit detent relation, FIGS. 18-20. Anchor portion 206 has first and second flanges 218 and 220 diverging oppositely therefrom and extending to respective first and second flange tips 222 and 224 engaging cover 34 in detent relation. Flange 218 extends from anchor portion 206 along a first arcuate direction along a rotational arc of rotation of housing sections 34 and 36. Flange 220 extends from anchor portion 206 along a second arcuate direction along the noted rotational arc of rotation of housing sections 34 and 36. The noted second arcuate direction is opposite to the noted first arcuate direction. Break-away mount 212 has first and second arcuately spaced pockets 226 and 228, FIG. 22, defining respective first and second lips 230 and 232. Pocket 226 receives flange tip 222. Pocket 228 receives flange tip 224. Lips 230 and 232 are arcuately spaced by an arcuate distance less than the arcuate distance between flange tips 222 and 224. Housing sections 34 and 36 are preferably plastic members, as is arm 204. At least one, and preferably all, of flanges 218, 220, and lips 230, 232, flex during break-away release of anchor portion 206 of arm 204 from break-away mount 212 of cover 34, as illustrated in FIG. 21. Anchor portion 206 has a C-shape and is flexible along the arc of the C to enable a release of hook portion 208 from engagement with housing section base 36 in response to the noted first normal release force, whereafter anchor portion 206 breaks away from housing section cover 34 in response to the noted second higher release force. Arm 204 at anchor portion 206 is re-assembled to housing section cover 34 by snapping flanges 218, 220 back into pockets 226, 228, or by sliding the flanges transversely thereinto as shown at arrow 240 in FIG. 15 whereafter anchor portion 206 is held in place by detent bump 242.

FIGS. 23-26 show another embodiment and use like reference numerals from above where appropriate to facilitate understanding. The lock structure includes an arm 250, FIG. 24, having an anchor portion 252 mounted to cover 34, and having a hook portion 254 releasably engaging base 36 at the noted slot 80 and applying a retention force stopping translational arcuate movement of the peripheries of housing sections 34 and 36, as above. Hook portion 254 is normally releasable from slot 80 of base 36 upon applying a first release force to arm 250 as shown at arrow 256 in FIG. 25, to permit translational movement of the peripheries of housing sections 34 and 36 as above. Anchor portion 252 is mounted to cover 34 at break-away mount 258 releasing anchor portion 252 from cover 34 in response to a second release force greater than the noted first release force, such that arm 250 separates from housing section cover 34, FIG. 26, without breaking the arm if a) excessive force higher than normal is required to release hook portion 256 from housing section base 36, or b) excessive force is continued to be applied to arm 250 even after release of hook portion 254 from slot 80 of housing section base 36, such that the housing may be re-assembled using the same housing sections 34 and 36 with arm 250 re-mounted to cover housing section 34 at break-away mount 258, without having to use a new housing section 34 to replace an old housing section otherwise having a non-re-mountable broken-off arm.

Arm 250 has a first arm segment 260 extending from anchor portion 252 along a first arm direction to hook portion 254, and has a second arm segment 262 extending from anchor portion 252 along a second arm direction to a leverage portion 264. The noted second arm direction is opposite to the noted first arm direction. Leverage portion 264 is engageable with cover housing section 34 at a fulcrum 266. Second arm section 262 has a length less than the length of the arm and provides a lever arm mechanical advantage to separate anchor portion 252 from housing cover section 34 upon pivoting arm 250 about fulcrum 266 in response to the noted second release force. Arm 250 has a third arm segment 268 extending from hook portion 254 along the noted first arm direction to a tip portion 270. At least one of the noted first and third arm segments 260 and 268 deflects during release of hook portion 254 from housing base section 36. In one embodiment, anchor portion 252 of arm 250 and break-away mount 258 of housing cover section 34 engage each other in ball-and-socket relation, e.g. at ball 272 and socket 274.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. The invention was developed during continuing development efforts directed toward filter housings, though it has broader application to various housings having first and second mating housing sections moveable relative to each other along a given translational direction, e.g. along the circumferential peripheries of housing sections rotatably mounted to each other, or other types of movement. Anti-translation lock structure such as provided by arms 204, 250 and break-away mounts 212, 258 apply retention force stopping the noted translational movement of the housing sections and afford the noted desirable break-away feature such that the housing may be re-assembled using the same housing sections with the arm re-mounted to a housing section at the break-away mount, without having to use a new housing section to replace an old housing section otherwise having a non-re-mountable broken-off arm.

What is claimed is:

1. A filter housing extending along a given axis comprising first and second mating housing sections, one of said housing sections being a base extending axially between distally opposite axial ends, the other of said housing sections being a cover mounted to one of said axial ends of said base by twist and lock structure providing an axial retention force holding said base and cover in axial assembled condition upon axial movement of said base and cover towards each other followed by rotation in a first rotational direction about said axis, said twist and lock structure having a first position permitting axial movement of said base and cover relative to each other, said twist and lock structure being rotatable in said first rotational direction from said first position to a second position, said twist and lock structure in said second position preventing axial movement of said base and cover relative to each other, said twist and lock structure being rotatable in a second rotational direction from said second position to said first position, said second rotational direction being opposite to said first rotational direction, anti-rotation lock structure comprising an arm having an anchor portion mounted to said first housing section, said arm having a hook portion engageable with said second housing section and applying a retention force stopping rotation of said twist and lock structure from said second position to said first position, said hook portion being normally releasable from engagement with said second housing section upon applying a first release force to said arm, said anchor portion being releasably mounted to said first housing section and wherein said anchor portion is mounted to said first housing section at a break-away mount releasing said anchor portion from said first housing section in response to a second release force greater than said first release force, such that said arm separates from said first housing section without breaking said arm if a) excessive force higher than normal is required to release said hook portion from said second housing section, or b) excessive force is continued to be applied to said arm even after release of said hook portion from said second housing section, such that said housing may be re-assembled using the same said first and second housing sections with said arm re-mounted to said first housing section at said break-away mount, without having to use a new first housing section to replace an old first housing section otherwise having a non-re-mountable broken-off arm.

2. The filter housing according to claim 1 wherein said anchor portion of said arm and said break-away mount of said first housing section engage each other in interference fit detent relation.

3. The filter housing according to claim 2 wherein said anchor portion has first and second flanges diverging oppositely therefrom and extending to respective first and second flange tips engaging said first housing section in said detent relation.

4. The filter housing according to claim 3 wherein:
said first flange extends from said anchor portion along a first arcuate direction along a rotational arc of rotation of said first and second housing sections relative to each other;
said second flange extends from said anchor portion along a second arcuate direction along said rotational arc of rotation of said first and second housing sections relative to each other, said second arcuate direction being opposite to said first arcuate direction;
said break-away mount of said first housing section comprises first and second arcuately spaced pockets defining respective first and second lips, said first pocket receiving said first flange tip, said second pocket receiving said second flange tip, said first and second lips being arcuately spaced by an arcuate distance less than the arcuate distance between said first and second flange tips.

5. The filter housing according to claim 4 wherein at least one of said flanges and said lips flexes during break-away release of said anchor portion of said arm from said break-away mount of said first housing section.

6. The filter housing according to claim 5 wherein said anchor portion has a C-shape and is flexible along the arc of the C to enable release of said hook portion releasable from engagement with said second housing section in response to said first release force.

7. The filter housing according to claim 2 wherein said arm has a first arm segment extending from said anchor portion along a first arm direction to said hook portion, and has a second arm segment extending from said anchor portion along a second arm direction to a leverage portion, said second arm direction being opposite to said first arm direction, said leverage portion being engageable with said first housing section at a fulcrum, said second arm section having a length less than the length of said arm and providing a lever arm mechanical advantage to separate said anchor portion from said first housing section upon pivoting said arm about said fulcrum in response to said second release force.

8. The filter housing according to claim 7 wherein said arm has a third arm segment extending from said hook portion along said first arm direction to a tip portion, and wherein at least one of said first and third arm segments deflects during release of said hook portion from said second housing section.

9. The filter housing according to claim 8 wherein said anchor portion of said arm and said break-away mount of said first housing section engage in ball-and-socket relation.

* * * * *